INVENTOR.
HOWARD H. HILL
BY
Weingarten, Orenbuch, & Pandiscio
ATTORNEYS

Aug. 18, 1964 H. H. HILL 3,145,342

UNIVERSAL LOGICAL ELEMENT

Filed March 15, 1961 4 Sheets-Sheet 2

*INVENTOR.*
HOWARD H. HILL
*BY*
Weingarten, Orenbuch, & Pandiscio
ATTORNEYS

INVENTOR.
HOWARD H. HILL
BY
Weingarten, Orenbuch, & Pandiscio
ATTORNEYS

INVENTOR.
HOWARD H. HILL
BY
Weingarten, Orenbuch & Pandiscio
ATTORNEYS

United States Patent Office 3,145,342
Patented Aug. 18, 1964

3,145,342

UNIVERSAL LOGICAL ELEMENT

Howard H. Hill, Northboro, Mass., assignor to Computer Control Company, Inc., a corporation of Delaware Filed Mar. 15, 1961, Ser. No. 95,946
6 Claims. (Cl. 328—92)

This invention relates in general to high speed electronic computing apparatus and more particularly pertains to a logical element capable of serving as the fundamental building block from which can be constructed almost any type of high speed digital computing electronic system.

A universal logical element capable of operating at a rate of one megacycle per second is described in Patent No. 2,820,897. The present invention is an improvement upon that logical element and permits operation at rates up to 25 megacycles per second.

The invention resides in an improved logical element employing non-return-to-zero information signals. The improved logical element is capable of performing logical operations at very high speeds and the signals transmitted between elements arranged to form a static computer system are D.C. levels. Historically, dynamic systems have used return-to-zero signals. That is, dynamic systems have employed signals that represent binary "ones" or "zeros" by the presence or absence of pulses. In such systems, a pulse must rise before clock time and return to a reference level before the next clock time. Return-to-zero dynamic systems, therefore, require their logical circuits to be capable of accommodating two transitions, one rise and one fall, for each bit of information. Non-return-to-zero signals, in contrast, represent information by two D.C. levels, binary "ones" being represented by one voltage level and binary "zeros" being represented by a different voltage level. In the non-return-to-zero system successive "ones" or successive 'zeros" occur as continuous D.C. levels and do not require the signal to return to a different value between clock pulses. Therefore, non-return-to-zero signals require at most a single transition from one D.C. level to another for each information bit. Where a short time interval is available for signal transitions, as is the case in high speed computers, non-return-to-zero signal representation requires less stringent control of signal rise and fall time, and with active circuit components having a fixed gain-bandwidth product, non-return-to-zero operation can be carried on at higher rates (i.e. higher clock frequencies) than is possible with return-to-zero operation.

The invention utilizes non-return-to-zero signals in a static logical element to achieve high operating rates with maximum freedom from timing problems. The invention is embodied in a logical element having an input structure consisting of a number of AND gates. The input AND gates are arranged to provide one of two D.C. levels at their outputs, the D.C. level depending upon the manner in which the gate is conditioned by its inputs. In binary notation one D.C. level is represented by a ONE and the other D.C. level is represented by a ZERO. The input AND gates have their output connected through an OR gate to the inputs of a delay device and an inverter. A pair of two-legged AND gates are arranged so that the output of one gate is coupled to the "set" input of a flip-flop and the output of the other gate is coupled to the flip-flop's "reset" input. Both of the two-legged AND gates have clock pulses applied to one of their inputs. The output of the delay device is arranged to inhibit or to condition one of the two-legged AND gates to pass clock pulses and the output of the inverter is arranged to inhibit or to condition the other of those two gates to pass clock pulses. Where the output of the delay device or the inverter is a ZERO, its associated two-legged AND gate is inhibited. Conversely, when the output of the delay device or the inverter is a ONE, the associated AND gate is conditioned to pass clock pulses. The delay device is arranged to delay only ONE signals. ZERO signals are not affected by the delay device. Since the inputs to the inverter and the delay device are coupled through the OR gate to the same signal source, when the source signal is a ONE, the output of the delay device is a delayed ONE whereas the inverter's output is a ZERO. When the source signal is a ZERO, the inverter's output is a ONE and the output of the delay device is an undelayed ZERO. Therefore, where the output of the OR gate is a ZERO, one of the two-legged AND gates is inhibited and the other of those gates is at the same time conditioned to permit a clock pulse to "set" the flip-flop. However, when the output of the OR gate is a ONE, the two-legged AND gates are both inhibited for an interval determined by the delay time of the delay device and thereafter one of those gates is conditioned to pass a clock pulse to "reset" the flip-flop. Due to this arrangement, the logical element is able to avoid faulty operation even though its input AND gates receive gate conditioning input signals during the existence of a clock pulse.

The organization of the invention and its mode of operation can be apprehended by a perusal of the following exposition when considered in conjunction with the accompanying drawings in which.

Figure 1:
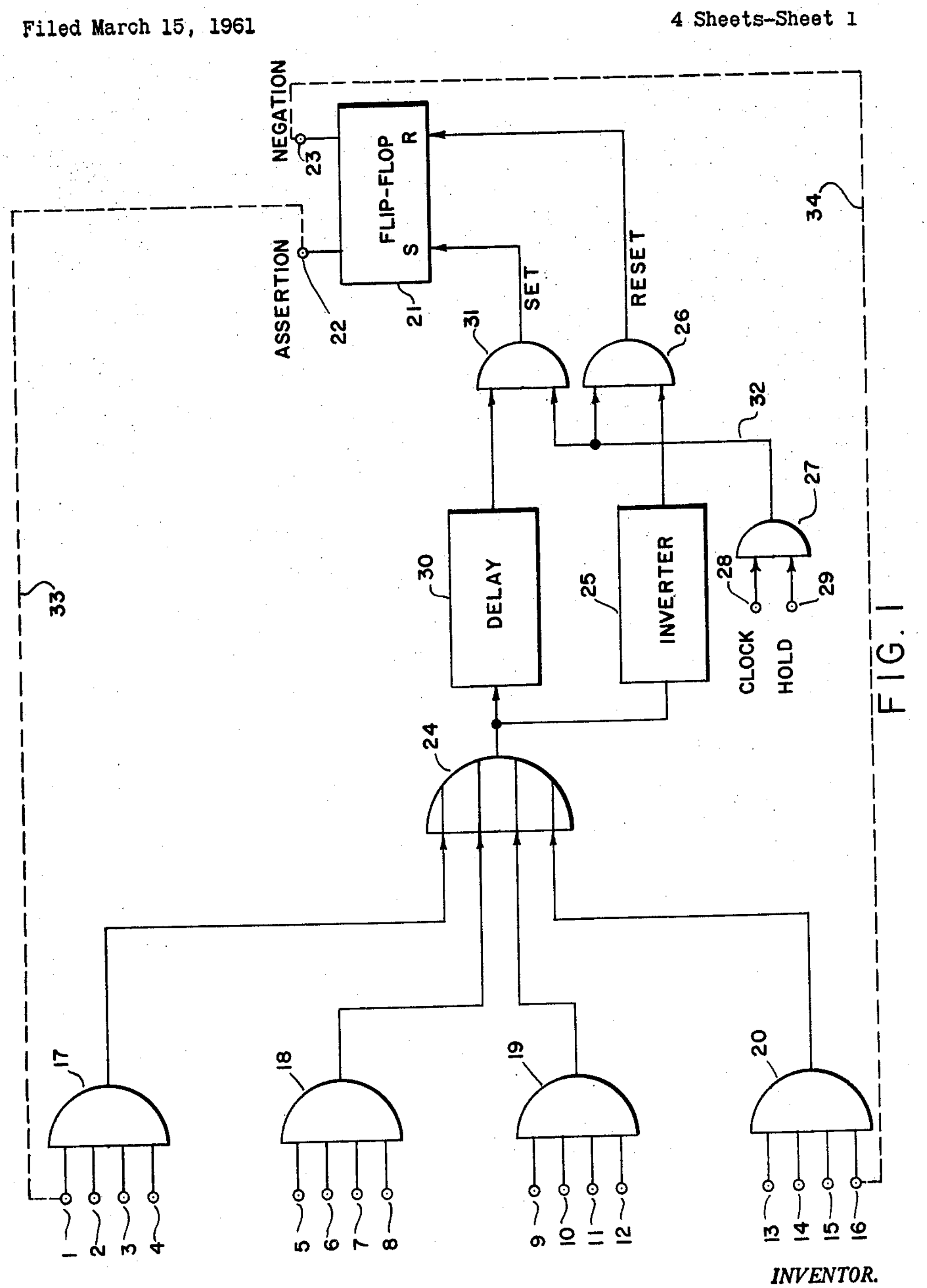
FIG. 1 illustrates the scheme of the invention.

Referring now to FIG. 1, there is shown the logical arrangement of a static digital circuit package capable of performing logical operations at high rates of speed. The outputs of the package are derived from a flip-flop 21 having output terminals 22 and 23, the signal obtained from terminal 22 being termed the assertion output and the signal obtained from terminal 23 being termed the negation output. The outputs of the package are of the non-return-to-zero type. That is, each output represents binary information by its D.C. level so that successive "ones" or successive "zeros" occur as continuous D.C. levels without the requirement that the signal return to another steady state betwene clock pulses. In a synchronous system, the clock pulse is the information sensing signal. The basic delay interval of such a system is the period between successive clock pulses. The width of the clock pulse establishes the time during which information is sensed. The clock pulse, of itself, carries no information from one circuit element to another. The flip-flop 21, in an ideal system, changes state only after a clock pulse and only the D.C. output levels of the flip-flop are transmitted between logic elements. It is well known that a flip-flop can be made to change states by applying a trigger pulse of the "off" side to cause that side to become conductive, or alternatively by applying a trigger pulse to the "on" side to cause that side to become cut off. In the preferred arrangement, flip-flop 21 is caused to change its state by applying a trigger pulse to the "on" side of the flip-flop, causing that side to become cut off. By the well known regenerative action of a flip-flop, when the "on" side is turned off, the "off" side is turned on. In an ideal flip-flop, the action is simultaneous so that when the assertion output falls from a first D.C. level to a second D.C. level, the negation output concurrently rises from the second level to the first level. A practical flip-flop, however, does not function in the ideal manner. In a practical flip-flop, the "on" and "off" sides do not change their states simultaneously so that one of the flip-flop's outputs will fall before the other output starts to rise. There is, hence, a delay between the assertion and negation outputs of the flip-flop. This delayed action effect is important as it may cause faulty operation of the logical circuits unless special precautions are taken.

The input structure of the logical package depicted in FIG. 1 consists of a number of AND gates, four such "AND" gates 17, 18, 19, 20 being shown by way of example. Preferably each AND gate has four inputs, although the number of inputs may be reduced or increased, as desired. The input terminals of the four AND gates are designated, in consecutive order, 1 through 16. Gates 17 to 20 are arranged so that each gate's output is either at one or the other of two D.C. levels, depending upon the conditioning of the gate. One of the two D.C. levels represents a binary ZERO and the other D.C. level represents a binary ONE. The outputs of the four-legged AND gates 17 to 20 are connected to a buffer 24, such buffers also being known as OR gates, the output of OR gate 24 being coupled to an inverter 25 whose output in turn, is connected to one input of AND gate 26. The other input to gate 26 is obtained from another AND gate 27 whose input 28 is energized by clock pulses and whose input 29 is adapted to receive gate inhibiting hold signals. The output of AND gate 26 is coupled to the reset (R) input of flip-flop 21. The output of buffer 24 is also coupled to the input of a delay device 30, the delay device being arranged to furnish its output to one input of AND gate 31. The other input to AND gate 31 is coupled by line 32 to the output of gate 27. Gate 31 is arranged so that a ZERO signal from delay device 30 inhibits the gate whereas a ONE signal conditions the gate to pass any coexistent clock pulse on line 32 to the "set" input of flip-flop 21. Gate 26 is arranged so that a ZERO signal from inverter 25 inhibits the gate whereas a ONE signal conditions the gate to pass clock pulses to the reset input of the flip-flop.

To illustrate the operation of the logical arrangement, assume a combination of inputs to gates 17, 18, 19, 20, conditioning any one of those gates so that its output is a ONE prior to or at the time a clock pulse is impressed at terminal 28 and assume that gate 27 is uninhibited so that the clock pulse is able to pass through it. The ONE signal is passed through buffer 24 to inverter 25 where the ONE signal is inverted and emerges as a ZERO. The emergent ZERO signal inhibits gate 26 and prevents the clock pulse on line 32 from passing through to the reset input of flip-flop 21. The ONE signal from gate 24 is also impressed upon the input of delay device 30. After a preset delay interval, the ONE signal emerges from the delay device and energizes one of the inputs of AND gate 31 so that the gate is conditioned to pass the clock pulse on line 32. The clock pulse passing through gate 31 "sets" the flip-flop 21 if it had been previously "reset," or leaves it "set" if it had previously been "set." When the flip-flop is "set," the assertion output at terminal 22 is active, that is the assertion output is a ONE and the negation output is inactive, i.e., a ZERO. As long as the input signal to gate 31 is a ONE at clock time, the gate is conditioned to pass the clock pulse, the flip-flop remains "set," and the assertion output at terminal 22 remains a ONE while the negation output remains a ZERO.

Where the combination of inputs to gates 17 to 20 condition all those gates so that their outputs are ZEROS prior to or at clock time, the input to OR gate 24 is a ZERO and through the action of inverter 25, the ZERO emerges from the inverter as a ONE. The ZERO passing through delay device 30 inhibits gate 31 so that the clock pulse cannot pass through that gate. The ONE signal from the inverter conditions gate 26 so that it passes the clock pulse on line 32 to the reset input of flip-flop 21. If the flip-flop was previously reset it remains in that state. However, if the flip-flop was previously set, the actuation of the reset input causes the flip-flop to change states, whereupon the negation output becomes a ONE and the assertion output becomes a ZERO.

Where gates 17 to 20 are conditioned at clock time so that they each provide a ZERO output, it is possible for one (or more) of those gates to be reconditioned during the existence of the clock pulse so that its output changes from ZERO to ONE. This condition is known as clock pulse splitting and can occur where the output of the logical package is used as an input feedback to itself, as indicated by the broken line 33 between the assertion output of flip-flop 21 and one of the inputs to gate 17, or as indicated by the broken line 34 between the negation output 23 and one of the inputs to gate 20. Clock pulse splitting can also occur where the output of one logical package is connected to an input of a similar logical package by a very short lead. Clock pulse splitting may result from a "late" clock pulse, from a "wide" clock pulse, or from an "early" input signal. The purpose of delay device 30 is to insure proper operation even when an input gate is reconditioned during the existence of a clock pulse.

Figure 2:
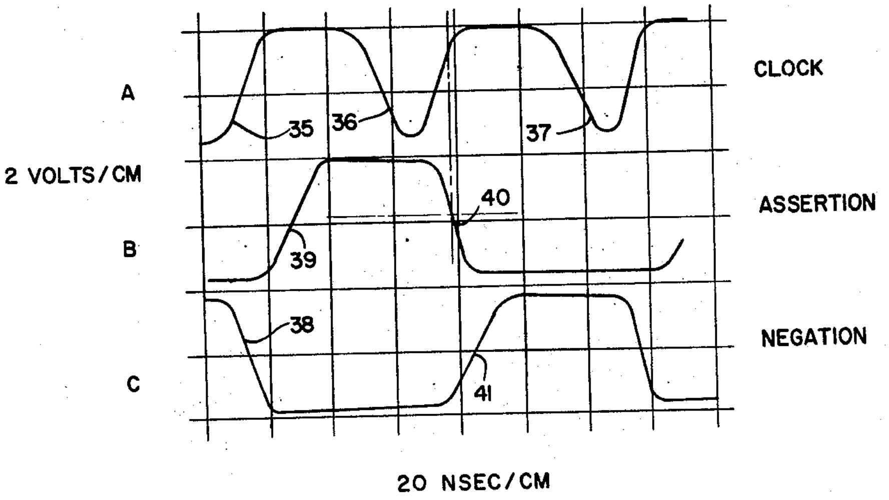
FIG. 2 depicts waveforms occurring in the operation of the invention.

Because of the arrangement of the logical package, any of gates 17 to 20 may be reconditioned during the existence of a clock pulse so that the gate's output changes from ZERO to ONE, but the opposite condition does not occur, that is, the output of the gates never changes from a ONE to a ZERO during the existence of a clock pulse. The reason for this can be more readily understood from FIG. 2 which depicts the time relationship of the assertion and negation outputs of flip-flop 21 with reference to the clock pulses 35, 36, 37, the latter being negative going pulses with only the trailing edge of pulse 35 being shown. When flip-flop 21 is set, the negation output falls, as shown by transition 38, while some ten nanoseconds ($10^{-9}$ sec.) later the assertion output rises, as indicated by transition 39. When flip-flop 21 is reset, the assertion output falls as indicated by transition 40, and about ten nanoseconds later the negation output rises as shown by transition 41. It is important to observe that the negative going transitions 38, 40, occur immediately at the end of the preceding clock pulse 35 or 36, where the positive going transitions 39, 41 occur well after the preceding clock pulse. Where a clock pulse is "late," it appears shifted slightly toward the right in FIG. 2A and, therefore, a late clock pulse can occur during a negative going assertion or negation transition. The clock pulse is never so late, however, that it occurs during a positive going transition. Where a clock pulse is somewhat wider than the pulses shown in FIG. 2A, the wide clock pulse may straddle a negative going assertion or negation transition, but the clock pulse is never so wide that it straddles a positive going transition. Similarly, if the input signals are "early," the assertion and negation outputs are in effect shifted slightly to the left in FIGS. 2B and 2C so that the negative going transitions 38, 40 occur during the existence of a clock pulse. In an ideal system, the positive and negative transitions in FIGS. 2B and 2C would occur only in the interval between the clock pulses and never during the existence of a clock pulse. In the practical system here disclosed, it is necessary to "dodge" the negative transition which splits the clock pulse, while it is not necessary to dodge the positive transition. It is possible to arrange the flip-flop 21 so that the positive transition must be "dodged," in which case it is unnecessary to dodge the negative transition. The logical package of FIG. 1 is arranged so that negative going transitions are delayed and, hence, cannot reach the set input of flip-flop 21 during the existence of a clock pulse while the positive going transitions are applied to the reset input without being delayed.

Figure 4:
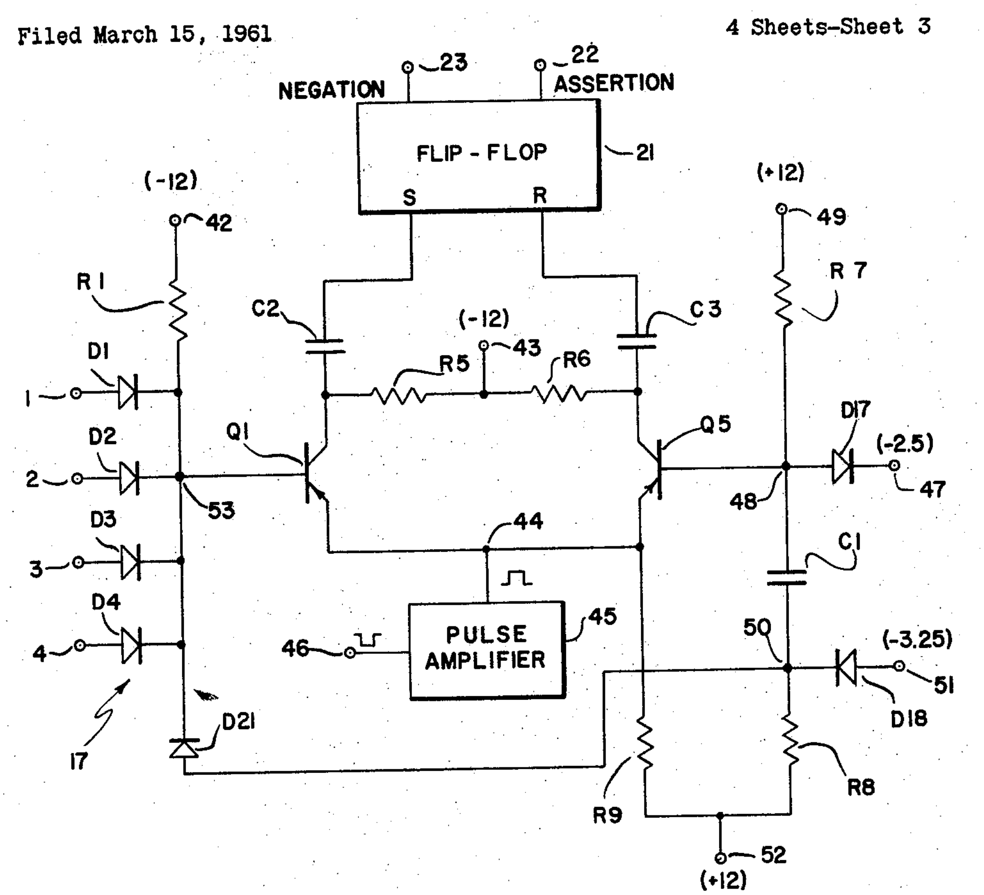
FIG. 4 shows a simplified form of the invention.

Turning now to FIG. 4, there is shown a schematic diagram of an arrangement embodying the invention. In order to simplify the explanation of the invention's operation, only one of the four input AND gates 17, 18, 19, 20 (FIG. 1) is depicted in FIG. 4 and since those four AND gates are identical in construction, the explanation treats only with gate 17. AND gate 17 consists of four diodes D1 to D4, each diode being connected between an input terminal 1, 2, 3, or 4 and the base of a PNP transistor Q1. A source 42 of negative potential (−12 volts) is connected by a resistor R1 to the base of transistor Q1 and the collector of that transistor is connected by a load resistor R5 to a terminal 43 at which a negative voltage (−12 volts) is impressed. A second transistor Q5 has its collector similarly connected to terminal 43 by a load resistor R6. The emitters of transistors Q1 and Q5 are connected at a junction 44 to the output of a pulse amplifier 45, the amplifier being excited by each clock pulse impressed at terminal 46. Transistor Q5 has its base connected by a diode D17 to a source 47 of bias potential (−2.5 volts). Junction 48, to which the base of transistor Q5 is connected, is connected by a resistor R7 to a source 49 of positive potential (+12 volts). The junction 48 is also coupled by a capacitor C1 to a junction 50 which is clamped by a diode D18 so that it cannot fall below the potential (−3.25 volts) impressed at terminal 51. A source 52 of positive voltage (+12 volts) is connected by a resistor R8 to junction 50 and by a resistor R9 of high ohmic value to the emitters of both transistors Q1 and Q5. The base of transistor Q1 is coupled by a diode D21 to junction 50. Flip-flop 21 has its set input (S) connected by capacitor C2 to the collector of transistor Q1, while the reset input (R) of the flip-flop is coupled by capacitor C3 to the collector of transistor Q5.

The operation of the circuit of FIG. 4 is such that in the interval between clock pulses, i.e., in the absence of an output current pulse from amplifier 45, the stray and junction capacities of transistors Q1 and Q5 become charged in advance of the next clock pulse. No appreciable emitter current flows during this interval because of thte large ohmic value of resistor R9 so that the transistors are effectively cut-off and only minimal input power is required. Any current flowing in the emitters of transistors Q1 and Q5, in the absence of a current pulse from amplifier 45, must pass through resistor R9. When amplifier 45 emits a current pulse, that pulse must flow through either or both of transistors Q1 and Q5. The current pulse will flow through that one of the two transistors whose base is the more negatively biased.

The signals applied to input terminals 1 to 4 of AND gate 17 can assume one of two stable D.C. levels, typical levels being 0 volts and −4 volts. A 0 volt input signal will be referred to in binary parlance as a ZERO whereas a −4 volt input signal will be referred to as a ONE. In order for gate 17 to be activated, all the inputs 1 to 4 must be ONE signals. Where any input is a ZERO, the base of transistor Q1 is held at 0 volts causing the ONE signals applied to the other input terminals to hold their respective diodes non-conducting. Thus, the base of transistor Q1 will be at 0 volts if any input impressed at terminals 1 to 4 is a ZERO. Where the input signal at terminal 1, for example, is a ZERO and the signals at the other terminals 2, 3, 4, are ONES, junction 53 is clamped by diode D1 to the 0 volt input and diodes D2, D3, and D4 are held non-conducting. While junction 53 is at 0 volts capacitor C1 charges through resistor R8, causing the voltage at junction 50 to rise. When the voltage at junction 50 reaches the voltage at junction 53, diode D21 conducts, thereby holding junction 50 at approximately 0 volts. The charging rate of $C_1$ through $R_8$ is rapid enough to fully charge $C_1$ in the interval between clock pulses. Thus the condition of the circuit immediately before clock time is that the base of Q1 is at 0 volts and the base of Q5 is at −2.5 volts. When the clock pulse is impressed at terminal 46, amplifier 45 emits a current pulse which must flow through either or both of transistors Q1 and Q5. The current pulse will flow through that one of the two transistors whose base is the more negatively biased. Hence, since the base of transistor Q1 is held at 0 volts by a ZERO input signal, the current pulse provided by amplifier 45 flows through transistor Q5 because the base of that transistor is maintained at −2.5 volts by clamping diode D17. The current flowing through transistor Q5 causes a pulse to be transmitted through capacitor C3 to the reset input of flip-flop 21. Where flip-flop 21 was originally in the "set" state, the pulse coupled through capacitor C3 causes the flip-flop to change to its reset state. If the flip-flop was originally in its reset state, the pulse from capacitor C3 does not affect the flip-flop and it remains in its original state.

Assuming now that during the existence of the clock pulse which reset flip-flop 21, inputs 1 to 4 all become ONES, so that gate 17 is reconditioned. Diodes D1 through D4 become non-conducting when the inputs fall to −4 volts. The voltage at junction 53 cannot go negative instantaneously, however, because that junction is coupled by diode D21 to the capacitor C1 and the capacitor must discharge through resistor R1 before the voltage at junction 53 drops. When the voltage at junction 50 attempts to go negative, a current flows through resistor R8 toward that junction which tends to maintain the junction positive. However, because the resistance of R1 is less than the resistance of R8, capacitor C1 is permitted to discharge and the potential at junction 50 falls. The time constant which applies to the discharge of capacitor C1 is determined by the values of capacitor C1, resistor R1, and resistor R8. The time constant is sufficiently long so that capacitor C1 and resistors R1 and R8 are, in effect, an integrator. The potential at junction 53, due to the action of the R1–R8–C1 integrator, falls sufficiently slowly so that before the voltage at junction 53 reaches −2.5 volts, the clock pulse has terminated. The −2.5 volt level is significant, inasmuch as the base of transistor Q1 must become more negative than the bias potential (−2.5 volts) applied to the base of transistor Q5 before amplifier 45 can be made to switch more than half its output current to the emitter of transistor Q1. If transistors Q1 and Q5 have their bases equally biased, one half the current from amplifier 45 flows through each transistor. In order to trigger flip-flop 21 from one state to another, more current must flow through one of transistors Q1 and Q5 than flows through the other. Hence, where the voltage at the base of transistor Q1 fails to drop below −2.5 volts before the clock pulse ends, flip-flop 21 remains reset. The integrator, therefore, prevents flip-flop 21 from being set by a ONE input signal which occurs during a clock pulse.

Figure 3:
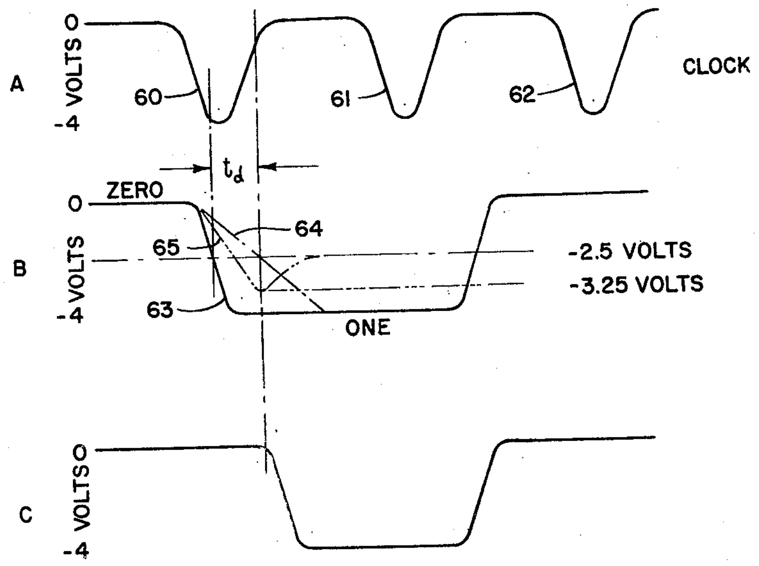
FIG. 3 illustrates the effect of the delay device upon an input which splits a clock pulse.

The action of the integrator of FIG. 4 can be more fully understood by considering FIG. 3. A train of clock pulses 60, 61, 62 is shown in FIG. 3A, the input to terminal 1 is shown in full lines in FIG. 3B, and the delayed action effect of the integrator is shown in FIG. 3C. Under the assumed state of facts, the input signals impressed at terminals 2, 3, 4 are all ONES, while the input to terminal 1 is ZERO before clock time and changes during the existence of clock pulse 60 to a ONE. Now if the negative going transition 63 (FIG. 3B) were not delayed, it would cause flip-flop 21 to be set during the existence of clock pulse 60, whereas for proper operation, the setting of flip-flop 21 should occur at the next clock pulse, that is, at clock pulse 61. The integrator C1–R1–R8 causes the slope of the transition to change so that the voltage at junction 53 (FIG. 4) falls toward the −2.5 volt level along the path indicated by line 64. Since the voltage at junction 53 reaches −2.5 volts when the clock pulse has effectively terminated, transistor Q1 remains cut off until the next clock pulse 61 occurs. During the interval between clock pulses 60 and 61 the voltage at junction 50 falls, due to the continued discharge of capacitor C1, to slightly below −3.25 volts, thereby causing diode D18 to conduct and clamp junction 50 at −3.25 volts. This in turn causes diode D21 to clamp the junction 53 at the −3.25 voltage level, whereby diodes D1 to D4 are held non-conducting as the signals impressed at input terminals 1 to 4 are −4 volt signals. The situation prior to the occurrence of clock pulse 61, then, is that the base of transistor Q1 is at −3.25 volts, while the base of transistor Q5 is at −2.5 volts. When clock pulse 61 is impressed at terminal 46 (FIG. 4), the current pulse from amplifier 45 flows through transistor Q1 and a trigger pulse is generated at the collector, which trigger pulse is coupled through capacitor C2 to the set input of flip-flop 21. The integrator C1–R1–R8 delays the negative going transition 63 (FIG. 3B) by an interval equal to $t_d$, that interval being sufficient to insure that the flip-flop cannot be "set" during the clock pulse split by the transition. The transition 63 is, in effect, delayed in time so that it is made to occupy the position shown in FIG. 3C.

Figure 5:
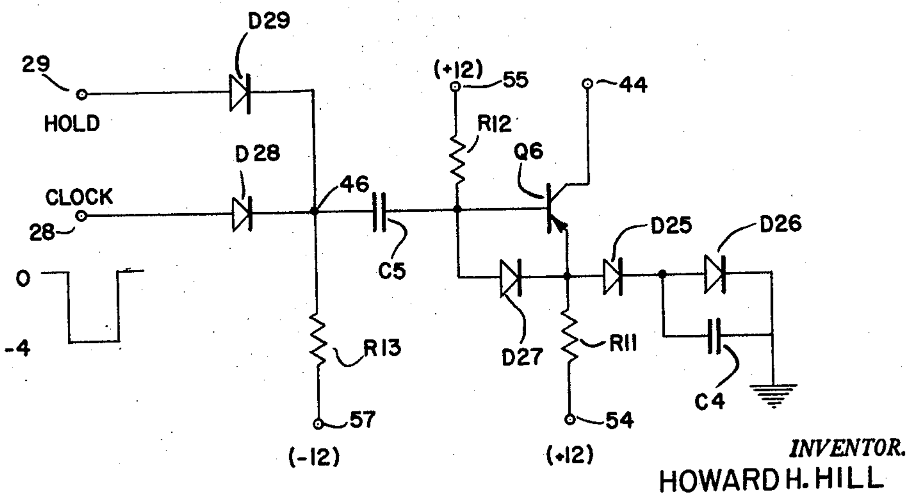
FIG. 5 is a schematic diagram of a pulse amplifier.

FIG. 5 illustrates a pulse amplifier of the type utilized in the invention to provide current pulses to gate the transistors Q1 and Q5. The pulse amplifier employs a transistor Q6 having its emitter connected through a resistor R11 to a terminal 54 at which a positive (12 volts) potential is applied. The emitter is grounded through a pair of serially connected diodes D25 and D26, the latter diode being shunted by a capacitor C4. The base of transistor Q6 is coupled to the potential at the emitter by a diode D27. The base is also connected by a resistor R12 to a terminal 55 at which is applied a positive potential of 12 volts. Transistor Q6 is normally biased off by the reverse bias existing between the base-emitter junction so that no current flows out of collector terminal 44. Input terminal 28 is connected by a diode D28 and a coupling capacitor C5 to the base of transistor Q6. The diode D28 is connected by a resistor R13 to a source of negative potential (−12 volts) applied at terminal 57. The clock pulses impressed at input terminal 28 are negatiev going pulses having a reference level of zero volts and an amplitude of four volts. In the interval between clock pulses, the junction 46 is clamped at the zero volt level by diode D28. When the negative going clock pulse arrives, it is coupled through capacitor C5 to the base of transistor Q6 causing diode D27 to become non-conducting, whereby the base is unclamped from the transistor's emitter. The base, therefore, becomes negative relative to the emitter for the duration of the clock pulse and, because of the forward bias, transistor Q6 conducts a current from its emitter to the collector output terminal 44. The magnitude of the emitter current pulse of Q6 is regulated to a predetermined proper level by R11. As shown in FIG. 4, the terminal 44 is connected to the emitters of transistors Q1 and Q5. The current pulse from terminal 44 must, therefore, flow through either one or both of those transistors. Where transistors Q1 and Q5 are unequally biased, the current pulse flows through that transistor which is the more forwardly biased.

For flexibility of computer operations, it is oftentimes desirable to hold information in some section of a computer while clocking other sections of the computer. To provide that flexibility, the clock input to pulse amplifier 45 is arranged so that it can be inhibited by a hold signal. In FIG. 5, junction 46 is coupled by a diode D29 to an input terminal 29 at which hold signals are applied. Diodes D28 and D29 form an AND gate (the AND gate 27 of FIG. 1) which can be inhibited by a hold signal applied at terminal 29. Since the clock signals are negative going pulses having a base line of 0 volts, the gate is enabled to pass the clock pulses when terminal 29 has a negative signal impressed thereon, whereas the gate is inhibited when the signal at terminal 29 is sufficiently positive to hold diode D28 non-conductive. When the AND gates formed by diodes D28 and D29 is inhibited, clock pulses are unable to pass to the amplifier and, therefore, no current pulse is emitted from terminal 44. In the absence of a current pulse, the flip-flop 21 cannot be provided with a trigger signal from either transistor Q1 or Q5. The flip-flop, therefore, cannot change states. A hold signal at terminal 29, consequently, acts to retain the information in the logical package despite the impress of a clock pulse at terminal 28.

Figure 6:
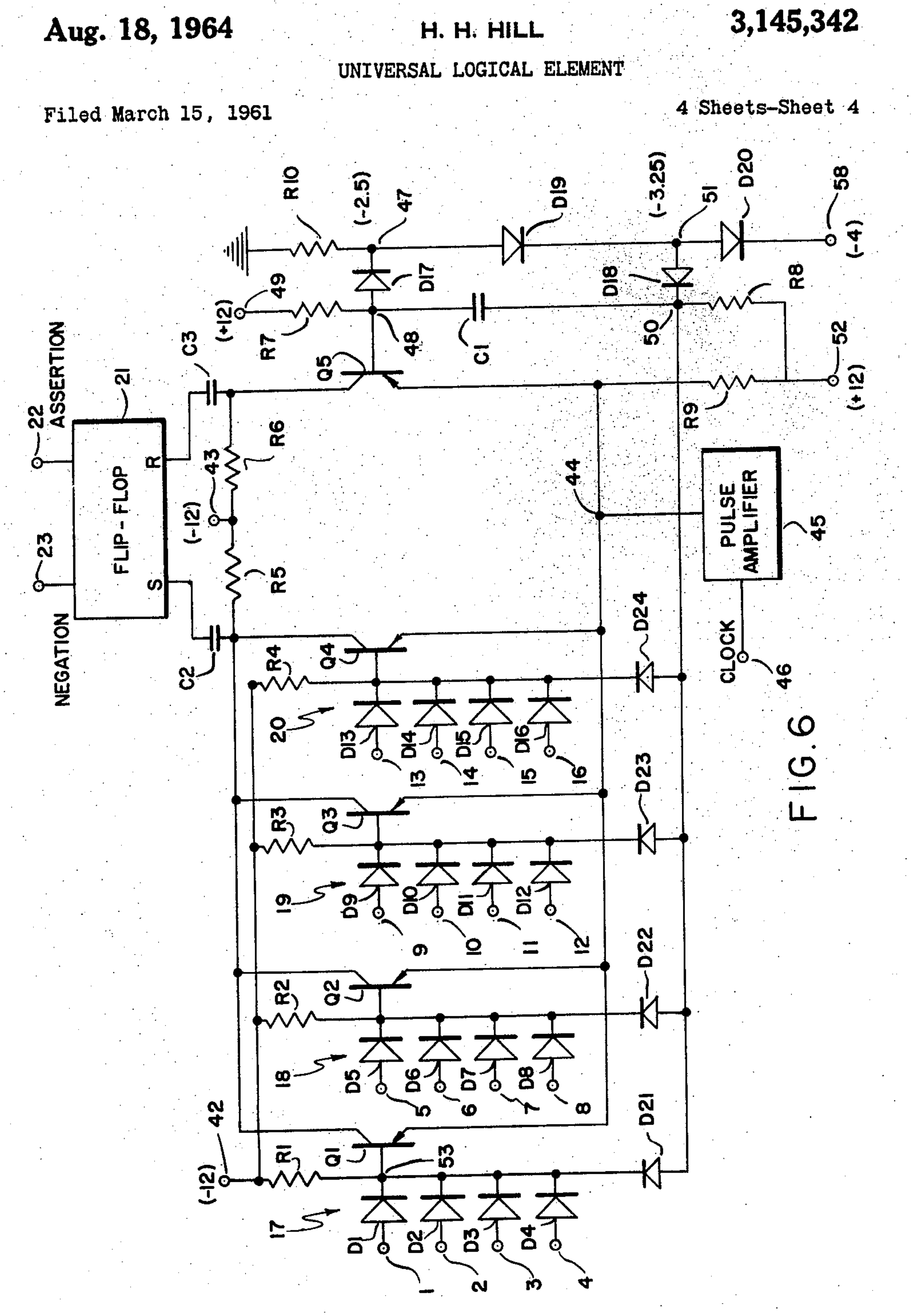
FIG. 6 illustrates the invention in detail.

FIG. 6 shows an arrangement which is similar to the arrangement of FIG. 4, with the exception that in FIG. 6 four input AND gates 17 to 20 are shown coupled to the junction 50 by diodes D21 and D24, and a voltage dropping network is shown at the extreme right of the figure. In order to maintain correspondence between FIGS. 4 and 6, the same reference numerals have been used to identify identical elements in the two illustrations. Referring now to the FIG. 6, the resistor R7 and diode D17 are part of a voltage dropping network which includes resistor R10 and diodes D19 and D20. Resistor R7 and diodes D17, D19, D20 are connected in series between a source 58 of negative potential (−4 volts) and the positive voltage source 49.

During the intervals when all of the gates 17 to 20 each have at least one of their inputs positive (for example, when the inputs at terminals 1, 5, 9, and 13 are ZERO), capacitor C1 is charged by a current regulated by resistor R8. Junction 50, then, rises in potential as C1 charges through resistor R8 from source 52 until one of the diodes D21, D22, D23, or D24 becomes forwardly biased and prevents further charging of the capacitor. Therefore, prior to the next negative going transition output from any of gates 17 to 20, C1 is always charged to a fixed potential.

Resistor R10 permits a current to flow through diodes D19 and D20 even though diode D17 becomes nonconductive. Diodes D19 and D20 are of the type which provide a forward voltage drop of ¾ of a volt, the voltage drop being relatively independent of current, so that junction 51 is held at −3.25 volts and junction 47 is maintained at −2.5 volts.

Capacitor C1 can be coupled to terminal 42 through diode D21 and resistor R1, or through diode D22 and resistor R2, or through diode D23 and resistor R3, or through diode D24 and resistor R4. There are thus four possible discharge paths for capacitor C1. The integrating action of capacitor C1, resistor R8, and resistor R1 has already been treated in connection with the operation of the arrangement shown in FIG. 4. The discussion of FIG. 4, however, was concerned with what occurred when only one of the input AND gates was reconditioned during the existence of a clock pulse. The delay mechanism, therefore, must be able to provide an appropriate delay even though the number of discharge paths for capacitor C1 may vary from one to four. In the event that more than one of the input AND gates, 17 to 20, receive reconditioning inputs simultaneously, the discharge current from capacitor C1 is increased by the number of AND gates simultaneously reconditioned by ONE inputs. Such an event would normally cause the delay interval to be reduced in proportion to the increase in discharge current from capacitor C1. The simultaneous reconditioning of two, three or four gates could reduce the delay interval to the point where pulse dodging is no longer accomplished. The reason for the reduction in delay is more apparent from the waveforms in FIG. 3B. The slope of line 64 indicates the action of the integrator when only one discharge path is available to capacitor C1. It is evident that line 64 crosses the −2.5 volt level at a time when the clock pulse 60 (FIG. 3A) has nearly completely decayed. The slope of line 65 indicates the action of the integrator when four discharge paths are available to capacitor C1. It is evident that line 65 crosses the −2.5 volt level at a time when the clock pulse 60 is still able to trigger transistors Q1 and Q4 and consequently the integrating action alone would not provide the delay $t_d$ necessary for clock pulse dodging.

Referring again to FIG. 6, it can be seen that capacitor C1 is not directly connected to ground or directly connected to a voltage source. Capacitor C1 is connected to a voltage reference point formed by the junction 48 of resistor R7 and diode D17. Where the current drawn out of C1 by integrating action exceeds the current available from resistor R7, junction 48 drops to a more negative potential causing diode D17 to be reversely biased. Upon becoming reversely biased, diode D17 unclamps junction 48 from the junction 47, permitting the voltage at junction 48 to drop below the −2.5 volt level. This action provides clock pulse dodging when more than one input gate is conditioned at one time. When junction 50 falls negatively too rapidly to provide adequate delay, as indicated by the line 65 of FIG. 3B, because the capacitor C1 is offered more than one discharge path, the negative voltage transient is transferred through capacitor C1 to junction 48, forcing the potential at the base of transistor Q5 to drop below the −2.5 volt level and be carried more negatively than the bases of transistors Q1 to Q4 for the remainder of the clock pulse. In effect, the negative voltage transient causes the reference voltage at the base of transistor Q5 to drop to a lower reference level when the capacitor C1 has more than one discharge path. It should be noted that when the voltage at junction 50 drops to a potential of slightly below −3.25 volts, diode D18 becomes forwardly biased and clamps junction 50 to the potential at junction 51. Since junction 50 is unable to drop below the potential at junction 51, the junction 48 cannot become more negative than −3.25 volts. In the case where all four input gates are simultaneously reconditioned, the potential at junction 48 would be unclamped from the −2.5 potential at junction 47 and would move down to a potential of 3.25 volts. This is indicated in FIG. 3B by the portion of curve 65 lying below the −2.5 volt level.

The operation of the delay mechanism embodied in the arrangement of FIG. 6 ensures pulse dodging, regardless of the number of input AND gates, 17 to 20, which may be reconditioned during the existence of a clock pulse.

What is claimed is:

1. A universal logic package comprising:
at least one AND gate adapted to provide either of two input signal voltage levels depending upon the condition of said gate;
a flip-flop;
a pair of transistors of the same polarity type having their emitters connected to one another and having their collectors respectively coupled to separate inputs of said flip-flop, the base of a first of said transistors being connected to the output of said gate;
means for forwardly biasing said collectors with a predetermined voltage;
means for imposing a reference bias voltage on the base of the second of said transistors;
a pulse current source connected to said emitters; and
means connected to the base of said first transistor for delaying the application to said base of only one of said signal levels in the event said one of said signal levels arises during the period of a pulse when said pulse is being conducted by said second transistor to said flip-flop.

2. A universal logic package as defined in claim 1 wherein said predetermined voltage has a value higher than the highest signal voltage level from said AND gate of the same polarity; and
said reference bias voltage is intermediate in value between said signal voltage levels.

3. A universal logic package as defined in claim 2 wherein said means for delaying is integrating means connected between the bases of said transistors.

4. Universal logic circuit package comprising:
input gate means providing output signals of either a first or second level according to the conditioning thereof;
a flip-flop for providing output signals of said package and having set and reset inputs;
a first coincidence gate having its output coupled to one of said flip-flop inputs, a second coincidence gate having its output connected to the other of said flip-flop inputs;

means for simultaneously impressing a clock pulse directly upon respective inputs of both of said coincidence gates;
means for so coupling another input of said first coincidence gate to said output signals of said input gate means that said first coincidence gate is biased by one of said first and second levels for passing said clock pulse to said flip-flop input and is biased by the other of said first and second levels for preventing passage of said pulse to said one input of said flip-flop;
means for impressing upon another input of said second coincidence gate a reference bias at a level intermediate said first and second levels;
means for coupling said another input together so that when said first coincidence gate is biased for preventing passage of said pulse said second coincidence gate is biased by said reference bias for passing said clock pulse to said other input of said flip-flop and when said first coincidence gate is biased by said one of said levels for passing said clock pulse, said second coincidence gate is biased for preventing passage of said clock pulse to said other of said flip-flop inputs; and
means connected to said another input of said first coincidence gate for delaying a change in the biasing of said first coincidence gate due to transition only of said first signal level to said second signal level so that said biasing cannot arise during the period a clock pulse appears at the respective input of said first coincidence gate.

5. A logic circuit package as defined in claim 4 wherein said input gate means comprises a plurality of AND gates, and including means for buffering said AND gates together for providing said output signals of either said first or second level.

6. A logical arrangement comprising:
a flip-flip having set and reset inputs;
at least one input gate adapted to provide an output of one of two levels of biasing signals selectively according to the condition of said gate;
a first transistor having its collector coupled to one of said flip-flop inputs;
a second transistor having its collector coupled to the other of said flip-flop inputs, and having its base connected to the output of said gate;
means for biasing the base of said first transistor at a value between the two output levels of said gate;
the emitters of both transistors being connected to one another;
means for impressing a clock pulse upon said emitters;
means for forwardly biasing said collectors; and
a capacitive element and a unilateral current conductive device connected in series between the base of said first transistor and the base of said second transistor.

References Cited in the file of this patent

UNITED STATES PATENTS

| | | |
|---|---|---|
| 2,880,317 | Vaughan | Mar. 31, 1959 |
| 2,918,587 | Rector et al. | Dec. 22, 1959 |
| 2,924,788 | Maurushat | Feb. 9, 1960 |
| 2,950,461 | Tryon | Aug. 23, 1960 |
| 2,967,276 | Colten | Jan. 3, 1961 |

FOREIGN PATENTS

| | | |
|---|---|---|
| 209,009 | Australia | July 26, 1956 |

OTHER REFERENCES

Arithmetic Operations in Digital Computers, by Richards (D. Van Nostrand Co.), New York, 1955, page 145.